(12) United States Patent
Qiu et al.

(10) Patent No.: US 11,685,041 B1
(45) Date of Patent: Jun. 27, 2023

(54) ROBOT HAVING FOUR SCREW PROPELLER BARRELS AND WALKING ON ALL TERRAIN

(71) Applicant: HANGZHOU CITY UNIVERSITY, Hangzhou (CN)

(72) Inventors: Qi Qiu, Hangzhou (CN); Xu Miao, Hangzhou (CN); Qianwei Hu, Hangzhou (CN); Hao Chen, Hangzhou (CN)

(73) Assignee: HANGZHOU CITY UNIVERSITY, Hangzhou (CN)

( * ) Notice: Subject to any disclaimer, the term of this patent is extended or adjusted under 35 U.S.C. 154(b) by 0 days.

(21) Appl. No.: 18/091,392

(22) Filed: Dec. 30, 2022

(30) Foreign Application Priority Data

Sep. 14, 2022 (CN) .......................... 202211116756.3

(51) Int. Cl.
  *B25J 9/00* (2006.01)
  *B25J 11/00* (2006.01)
  *B25J 5/00* (2006.01)

(52) U.S. Cl.
  CPC .............. *B25J 9/0009* (2013.01); *B25J 5/00* (2013.01); *B25J 11/005* (2013.01)

(58) Field of Classification Search
  CPC .......... B25J 5/00; B25J 9/0009; B25J 11/005; B60F 3/0023; B62D 57/036
  See application file for complete search history.

(56) References Cited

U.S. PATENT DOCUMENTS

| 8,579,056 | B1* | 11/2013 | Frank | B62D 57/036 |
| | | | | 440/12.65 |
| 2018/0119868 | A1* | 5/2018 | Souvestre | B63H 1/12 |
| 2020/0039591 | A1* | 2/2020 | Gawrys | B60F 3/0023 |
| 2021/0156108 | A1* | 5/2021 | Marvi | E02F 3/246 |
| 2023/0063961 | A1* | 3/2023 | Lipsett | B60F 3/0023 |

FOREIGN PATENT DOCUMENTS

| CN | 104691649 A | 6/2015 |
| CN | 106078716 A | 11/2016 |
| WO | 2016177436 A1 | 11/2016 |
| WO | 2021237442 A1 | 12/2021 |

* cited by examiner

*Primary Examiner* — Dale Moyer

(57) ABSTRACT

A robot having four screw propeller barrels and able to walk on all types of terrains is provided and includes: a housing, wherein each of four corners of the housing is arranged with a driving shaft, four driving shafts are arranged for the four corners and form a rectangle and are connected to a motor, a rotation surface of the driving shaft is parallel to a same vertical surface. An end of the driving shaft is arranged with a connection base, the connection base is arranged with a shaftless motor, an output end of the shaftless motor has a rotation surface perpendicular to the rotation surface of the driving shaft. The output end of the shaftless motor is arranged with a connection bracket, a bottom surface of the connection bracket is arranged with a plurality of connection rings arranged successively along a straight line.

5 Claims, 3 Drawing Sheets

ROBOT HAVING FOUR SCREW PROPELLER BARRELS AND WALKING ON ALL TERRAIN

CROSS REFERENCE TO RELATED APPLICATIONS

The present application claims the priority of the Chinese Patent Application No. 202211116756.3, filed on Sep. 14, 2022, and the entire contents of which are hereby incorporated by reference in their entireties.

TECHNICAL FIELD

The present disclosure relates to the field of ground drilling devices, and in particular to a robot having four screw propeller barrels and able to walk on all types of terrains.

BACKGROUND

In the art, performing geological exploration operations usually requires setting up a large excavation device on the ground. However, there are shortcomings such as time-consuming, high energy consumption, high costs, and restricted by environmental conditions of the ground. Therefore, an actual applicational effect is not ideal. A drilling robot is gradually being widely used due to its small size, low power consumption and flexible movement. In the art, a drilling robot is generally an individual structure configured with a drill bit and moves based on moving wheels or a crawler arranged on the robot. A size of the drilling robot in the art is often large, and the drilling robot is less applicable. Further, the drilling robot needs to be arranged with various types of drill bits for various drilling scenarios, such that drilling robot and the drilling bits are less portable.

SUMMARY OF THE DISCLOSURE

The present disclosure aims to provide a robot having four screw propeller barrels and able to wall on all types of terrains. In the present disclosure, an orientation of each drilling mechanism is adjusted, such that the robot may be able to move and at the same time have a reduced size. further, a pitch may be flexibly adjusted to allow the robot to be applicable for various scenarios without preparing multiple drilling bits.

According to the present disclosure, a robot having four screw propeller barrels and able to walk on all types of terrains is provided and includes: a housing, wherein each of four corners of the housing is arranged with a driving shaft, four driving shafts are arranged for the four corners and form a rectangle and are connected to a motor, a rotation surface of the driving shaft is parallel to a same vertical surface. An end of the driving shaft is arranged with a connection base, the connection base is arranged with a shaftless motor, an output end of the shaftless motor has a rotation surface perpendicular to the rotation surface of the driving shaft. The output end of the shaftless motor is arranged with a connection bracket, a bottom surface of the connection bracket is arranged with a plurality of connection rings arranged successively along a straight line, the plurality of connection rings are connected with each other to form a column, a side of each connection ring is arranged with a plurality of blades, blades of one of the plurality of connection rings are misaligned with blades of another one of the plurality of connection rings, blades of all of the plurality of connection rings form a spiral structure, one of the plurality of connection rings disposed at an end of the column is provided with a ring-shaped base, an inner side of the ring-shaped base is arranged with a plurality of paddles. Each of a bottom surface of the connection bracket and a bottom surface of each connection ring is arranged with a plurality of blocks, the plurality of blocks are evenly distributed and arranged along the ring shape, a top surface of each connection ring and a top face of the ring-shaped base defines a plurality of slots to be engage with the plurality of blocks; and the housing is arranged with a camera and an infrared sensor.

In some embodiments, a side of the housing is arranged with a photovoltaic panel compartment, the photovoltaic panel compartment is arranged a compartment door rotatably connected to the photovoltaic panel compartment, a first photovoltaic panel is arranged inside the photovoltaic panel compartment and is rotatably connected to the photovoltaic panel compartment, and an end of the first photovoltaic panel is rotatably connected to a second photovoltaic panel.

In some embodiments, a middle portion of the connection base and a middle portion of the connection bracket are hollow, and the middle portion of the connection base and the middle portion of the connection bracket correspond to an inner ring of the connection ring and an inner ring of the ring-shaped base.

In some embodiments, the connection base defines an outer connection screw hole, the shaftless motor defines an inner connection screw hole corresponding to the outer connection screw hole, a bolt is configured to extend through the outer connection screw hole and the inner connection screw hole to connect the connection base with the shaftless motor.

In some embodiments, an outer end corner of the ring-shaped base is rounded.

Compared to the related art, the present disclosure may have the following technical effects.

1. In the present disclosure, each of four corners of the housing is arranged with a driving shaft. Four driving shafts are arranged at the four corners and cooperatively form a rectangle. Each driving shaft is connected to a motor. A rotation surface of each driving shaft is parallel to a same vertical surface. An end of the driving shaft is arranged with a connection base. The connection base is arranged with a shaftless motor. A rotation surface of an output end of the shaftless motor is perpendicular to the rotation surface of the driving shaft. The output end of the shaftless motor is arranged with a connection bracket. A bottom surface of the connection bracket is arranged with a plurality of connection rings. The plurality of connection rings are arranged linearly. A side of each of the plurality of connection rings is arranged with a plurality of blades. Blades of the plurality of connection rings are misaligned with each other to form a spiral. The connection ring disposed at an end is arranged with a ring-shaped base. An inner side of the ring-shaped base is arranged with a plurality of paddles. Each of the bottom surface of the connection ring and the connection bracket is arranged with a plurality of blocks. The plurality of blocks are arranged in a ring shape and distributed evenly. Each of the top surface of the ring-shaped base and the connection ring is arranged with a block engaged with a slot. While the device is moving, the motor drives each driving shaft to rotate to further drive the connection base to rotate. A column formed by the connection rings is controlled, by the connection base, to be parallel to the horizontal plane, such that the blades completely contact the ground, blades at four directions cooperatively form a support, and the device may be highly reliable. At this moment, the shaftless motor may be initiated, rotation of the shaftless motor drives each connection ring to rotate to further drive the device to move on the ground through the blades. The device may turn a moving direction based on a speed difference between shaftless motors disposed at two opposite sides. When the ground is to be drilled, two driving shafts on a same side of the device are rotated, such that the two columns on the side where the two driving shafts are arranged may lift a shell at the corresponding side. Further, two columns on the other side are inclined relative to the bottom. At this moment, the shaftless motor is initiated, spiral-shaped blades are formed to perform ground drilling. Meanwhile, the blades on the other side also rotate to provide a power for the device to move forward. In this way, a good drilling effect is achieved. Movement and drilling of the device may be achieved at the same time by cooperation of rotation of the driving shaft and the columns, and additional moving mechanisms are not required, and the size of the device is reduced effectively.

2. The connection ring of the present disclosure is fixed by the engaging the block into the card slot. Further, a plurality of blocks are arranged. Therefore, when configuring the connection rings, an angle difference between two blades may be achieved by deflecting a docking angle of a next connection ring. The rest of the connection rings may be configured similarly. In this way, spiral structure of the blades may be achieved. The pitch of the spiral structure may be adjusted by changing an angle difference between adjacent blades. In this way, different drilling thrusts may be obtained, and there is no need to prepare various sizes of drill bits for backup, the device may be used more conveniently.

3. In the present disclosure, a middle part of the connection base and a middle part of the connection bracket are hollow. The middle part of the connection base and the middle part of the connection bracket correspond to and are connected to the connection ring and an inner ring of the ring-shaped base to form an inner cavity. When the device is drilling, a downward drilling resistance may be reduced effectively. In addition, the paddles may exhibit an auxiliary downward drilling effect, such that the drilling efficiency is further increased.

Figure 1:
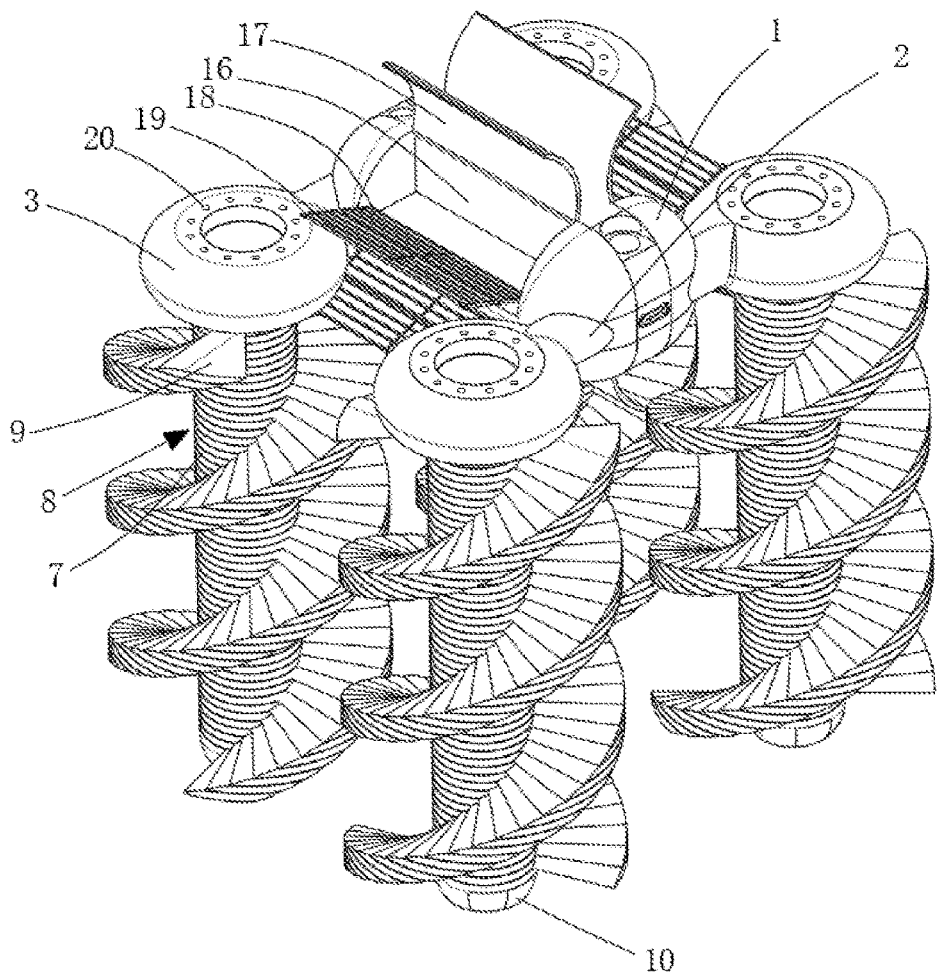
FIG. 1 is a structural schematic view of a device according to the present disclosure.
Figure 2:
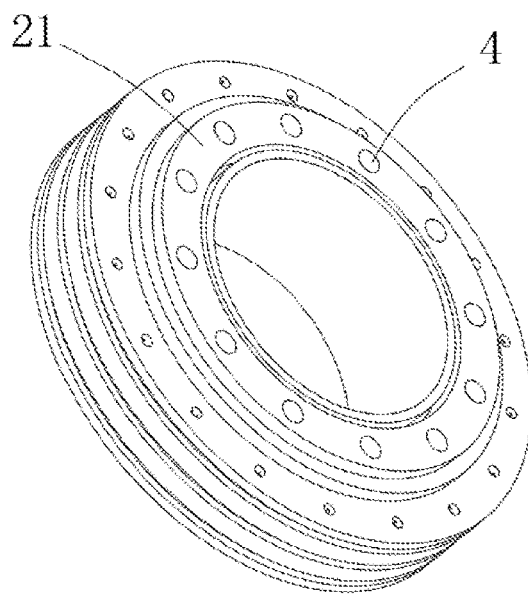
FIG. 2 is a structural schematic view of a shaftless motor according to the present disclosure.
Figure 3:
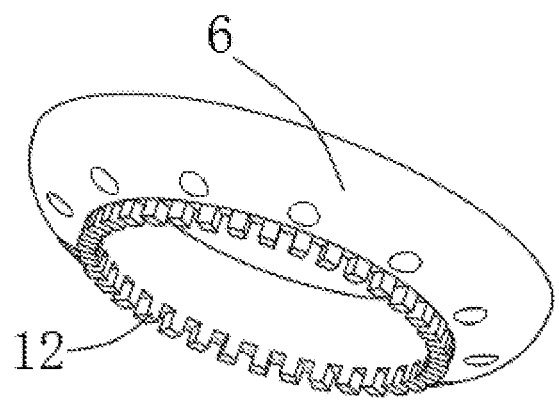
FIG. 3 is a structural schematic view of a connection bracket according to the present disclosure.
Figure 4:
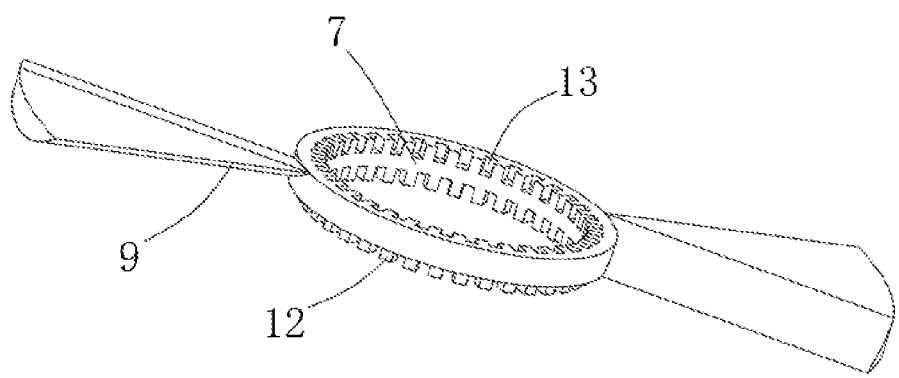
FIG. 4 is a structural schematic view of a connection ring according to the present disclosure.
Figure 5:
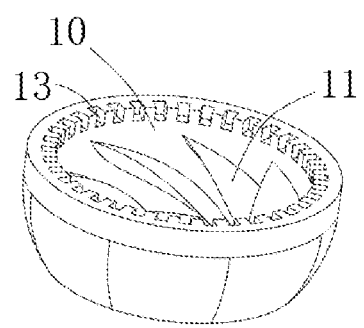
FIG. 5 is a structural schematic view of a ring-shaped base according to the present disclosure.

In the drawings: 1—housing; 2—driving shaft; 3—connection base; 4—shaftless motor; 6—connection bracket; 7—connection ring; 8—column; 9—blade; 10—ring base; 11—paddle; 12—stopper; 12—block; 13—slot; 14—camera; 15—infrared sensor; 16—photovoltaic panel compartment; 17—compartment door; 18—first photovoltaic panel; 19—second photovoltaic panel; 20—outer connection screw hole; 21—inner connection screw hole

DETAILED DESCRIPTION

The present disclosure is further described below by referring to the accompanying drawings and examples, but is limited by the following description.

Embodiment: A robot having four screw propeller barrels and able to walk on all types of terrains is provided. As shown in FIG. 1, the robot includes a housing 1. Each of four corners of the housing 1 is arranged with a driving shaft 2. Four driving shafts 2 are arranged for the four corners and form a rectangle and are connected to a motor. A rotation surface of each driving shaft 2 is parallel to a same vertical surface. As shown in FIGS. 2 to 5, an end of each driving shaft 2 is arranged with a connection base 3. The connection base 3 is arranged with a shaftless motor 4, which is hollow and is commercially available, and will not be described herein. An output end of the shaftless motor 4 has a rotation surface perpendicular to the rotation surface of the driving shaft 2. The output end of the shaftless motor 4 is arranged with a connection bracket 6. A bottom surface of the connection bracket 6 is arranged with a plurality of connection rings 7 arranged successively along a straight line. The plurality of connection rings 7 are connected with each other to form a column 8. A side of each connection ring 7 is arranged with a plurality of blades 9. The blades 9 of one of the plurality of connection rings 7 are misaligned with the blades 9 of another one of the plurality of connection rings 7, such that the blades 9 of all of the plurality of connection rings 7 form a spiral structure. One of the plurality of connection rings 7 disposed at an end of the column 8 is provided with a ring-shaped base 10. An inner side of the ring-shaped base 10 is arranged with a plurality of paddles 11. A bottom surface of the connection bracket 6 and a bottom surface of each connection ring 7 are arranged with a plurality of blocks 12. The plurality of blocks 12 are evenly distributed and arranged along the ring shape. A top surface of the connection ring 7 and a top face of the ring-shaped base 10 defines a plurality of slots 13 to engage with the plurality of blocks. The housing 1 is arranged with a camera 14 and an infrared sensor 15 configured for visual monitoring. A control system and a power supply are arranged inside the housing. A side of the housing 1 is arranged with a photovoltaic panel compartment 16. The photovoltaic panel compartment 16 is arranged a compartment door 17 rotatably connected to the photovoltaic panel compartment 16. A first photovoltaic panel 18 is arranged inside the photovoltaic panel compartment 16 and is rotatably connected to the photovoltaic panel compartment 16. An end of the first photovoltaic panel 18 is rotatably connected to a second photovoltaic panel 19. The first photovoltaic panel, the second photovoltaic panel, and the compartment door are all connected to the motor. When the compartment door is closed, the first photovoltaic panel and the second photovoltaic panel are folded with each other to be stored. When the compartment door is opened, the first photovoltaic panel and the second photovoltaic panel are unfolded to charge the power supply. A middle portion of the connection base 3 and a middle portion of the connection bracket 6 are hollow. The middle portion of the connection base 3 and the middle portion of the connection bracket 6 correspond to an inner ring of the connection ring 7 and an inner ring of the ring-shaped base 10. The connection base 3 defines an outer connection screw hole 20. The shaftless motor 4 defines an inner connection screw hole 21 corresponding to the outer connection screw hole 20. A bolt may extend through the outer connection screw hole 20 and the inner connection screw hole 21 to connect the connection base 3 with the shaftless motor 4. The connection may be achieved easily. An outer end corner of the ring-shaped base 10 is rounded, such that resistance when drilling may be reduced.

Figure 6:
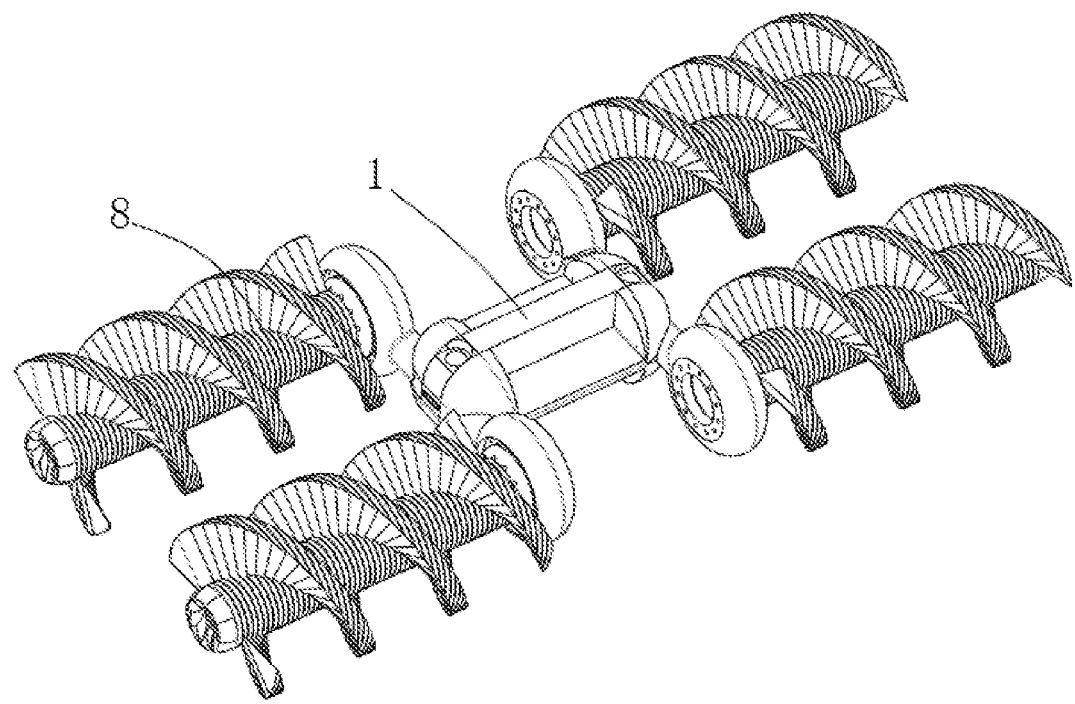
FIG. 6 is a structural schematic view of the device on a plane according to the present disclosure.
Figure 7:
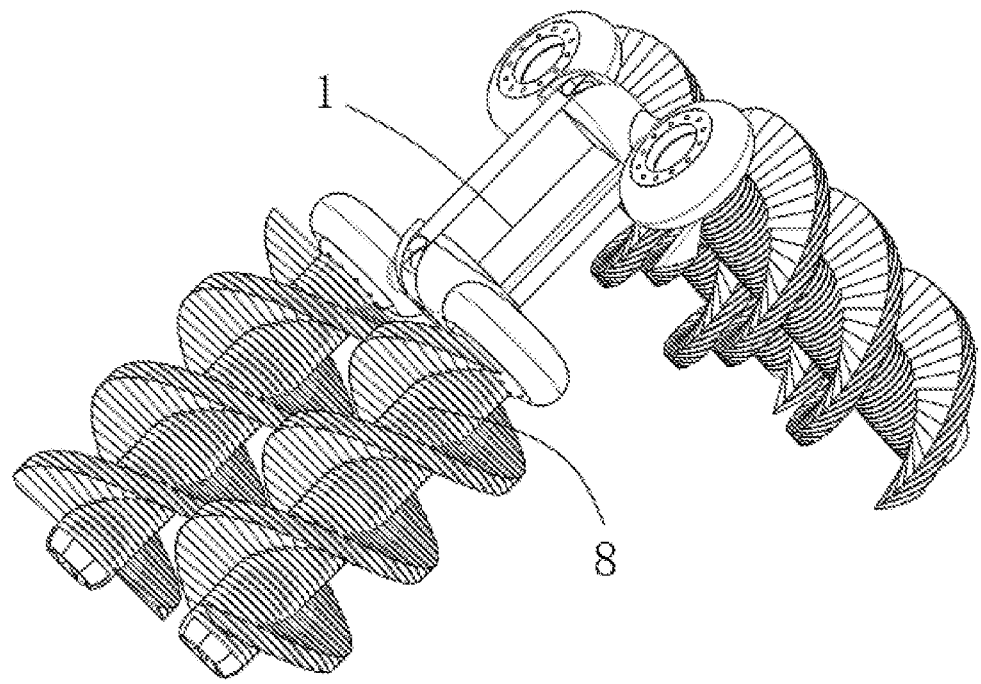
FIG. 7 is a structural schematic view of the device being drilling according to the present disclosure.

An operation principal is as follows. As shown in FIG. 6, when the robot is moving, the motor drives each driving shaft to rotate to further drive the connection base to rotate. The column formed by the connection rings is controlled to be parallel to the horizontal plane by the connection base, such that the blades completely contact the ground. The blades at the four corners cooperatively form a support, such that the robot is highly reliable. At this moment, the shaftless motor is initiated. Rotation of the shaftless motor drives each connection ring to rotate to further drive the robot to move on the ground by the blades. A moving direction of the robot may be turned based on a speed difference between the shaftless motors disposed on two opposite sides of the robot. Two types of moving are available. For a first type of moving, two parallel columns on a same side of the robot rotate in a same direction, such that the robot may move like a four-wheel trolley. For a second type of moving, two columns, which are disposed on different sides of the robot and are extending co-linearly, rotate in a same direction, such that the robot may move like a device having double-rolling tracks. As shown in FIG. 7, when the ground is to be drilled, the two driving shafts on the same side of the robot are rotating, such that two columns on the side where the two rotating driving shafts are located may lift a corresponding side of the housing, and two columns on the other side are inclined relative to the bottom surface. At this moment, the shaftless motor is initiated, and the spiral-shaped blades may drill the ground. Meanwhile, the blades on the other side of the robot also rotate to provide a power for the robot to move forward. A better drilling effect may be achieved. Alternatively, the four columns may be rotated downwards at the same time to drill the ground. Movement and drilling of the robot may be achieved at the same time by cooperation of rotation of the driving shaft and the columns, and additional moving mechanisms are not required, and the size of the robot is reduced effectively.

What is claimed is:

1. A robot having four screw propeller barrels and able to walk on all types of terrains, comprising: a housing, wherein each of four corners of the housing is arranged with a driving shaft, four driving shafts are arranged for the four corners and form a rectangle and are connected to a motor, a rotation surface of the driving shaft is parallel to a same vertical surface;

wherein an end of the driving shaft is arranged with a connection base, the connection base is arranged with a shaftless motor, an output end of the shaftless motor has a rotation surface perpendicular to the rotation surface of the driving shaft;

the output end of the shaftless motor is arranged with a connection bracket, a bottom surface of the connection bracket is arranged with a plurality of connection rings arranged successively along a straight line, the plurality of connection rings are connected with each other to form a column, a side of each connection ring is arranged with a plurality of blades, blades of one of the plurality of connection rings are misaligned with blades of another one of the plurality of connection rings, blades of all of the plurality of connection rings form a spiral structure, one of the plurality of connection rings disposed at an end of the column is provided with a ring-shaped base, an inner side of the ring-shaped base is arranged with a plurality of paddles;

each of a bottom surface of the connection bracket and a bottom surface of each connection ring is arranged with a plurality of blocks, the plurality of blocks are evenly distributed and arranged along the ring shape, a top surface of each connection ring and a top face of the ring-shaped base defines a plurality of slots to be engage with the plurality of blocks; and the housing is arranged with a camera and an infrared sensor.

2. The robot according to claim 1, wherein a side of the housing is arranged with a photovoltaic panel compartment, the photovoltaic panel compartment is arranged a compartment door rotatably connected to the photovoltaic panel compartment, a first photovoltaic panel is arranged inside the photovoltaic panel compartment and is rotatably connected to the photovoltaic panel compartment, and an end of the first photovoltaic panel is rotatably connected to a second photovoltaic panel.

3. The robot according to claim 1, wherein a middle portion of the connection base and a middle portion of the connection bracket are hollow, and the middle portion of the connection base and the middle portion of the connection bracket correspond to an inner ring of the connection ring and an inner ring of the ring-shaped base.

4. The robot according to claim 1, wherein the connection base defines an outer connection screw hole, the shaftless motor defines an inner connection screw hole corresponding to the outer connection screw hole, a bolt is configured to extend through the outer connection screw hole and the inner connection screw hole to connect the connection base with the shaftless motor.

5. The robot according to claim 1, wherein an outer end corner of the ring-shaped base is rounded.

* * * * *